US 9,686,194 B2

(12) United States Patent
Jacobson et al.

(10) Patent No.: US 9,686,194 B2
(45) Date of Patent: Jun. 20, 2017

(54) ADAPTIVE MULTI-INTERFACE USE FOR CONTENT NETWORKING

(71) Applicant: CISCO TECHNOLOGY, INC., San Jose, CA (US)

(72) Inventors: Van L. Jacobson, Montara, CA (US); James D. Thornton, Redwood City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 148 days.

(21) Appl. No.: 14/581,817

(22) Filed: Dec. 23, 2014

(65) Prior Publication Data
US 2015/0113163 A1 Apr. 23, 2015

Related U.S. Application Data

(63) Continuation of application No. 12/603,336, filed on Oct. 21, 2009, now Pat. No. 8,923,293.

(51) Int. Cl.
H04L 12/745 (2013.01)
H04L 29/08 (2006.01)
(Continued)

(52) U.S. Cl.
CPC ...... *H04L 45/745* (2013.01); *G06F 17/30861* (2013.01); *H04L 45/12* (2013.01);
(Continued)

(58) Field of Classification Search
CPC ....... H04L 67/326; H04L 69/22; H04L 45/74; H04L 45/748; H04L 67/322–67/327; H04L 49/355; H04L 45/306
See application file for complete search history.

(56) References Cited

U.S. PATENT DOCUMENTS 817,441 A 4/1906 Niesz
4,309,569 A 1/1982 Merkle
(Continued)

FOREIGN PATENT DOCUMENTS

DE 1720277 A1 6/1967
DE 19620817 A1 11/1997
(Continued)

OTHER PUBLICATIONS

Fall, K. et al., "DTN: an architectural retrospective", Selected areas in communications, IEEE Journal on, vol. 28, No. 5, Jun. 1, 2008, pp. 828-835.

(Continued)

*Primary Examiner* — Marcus R Smith
(74) *Attorney, Agent, or Firm* — Patent Capital Group

(57) ABSTRACT

One embodiment provides a system that forwards a packet with a hierarchically structured variable-length identifier (HSVLI) in a network. An HSVLI indicates a piece of content and indicates a hierarchical structure of contiguous components ordered from a most general level to a most specific level. The length of the HSVLI is not fixed. During operation, the system receives a packet which contains an interest for a piece of content with an HSVLI. Subsequently, the system determines forwarding information for the HSVLI based on one or more of: knowledge of content which matches the HSVLI, a forwarding policy, and contextual information about the network. Next, the system configures a forwarding engine with the forwarding information. The system then forwards the packet based on the forwarding information.

19 Claims, 6 Drawing Sheets

(51) Int. Cl.
*H04L 12/741* (2013.01)
*G06F 17/30* (2006.01)
*H04L 12/721* (2013.01)
*H04L 29/12* (2006.01)
*H04L 29/06* (2006.01)

(52) U.S. Cl.
CPC .............. *H04L 45/54* (2013.01); *H04L 45/70* (2013.01); *H04L 45/748* (2013.01); *H04L 67/327* (2013.01); *H04L 29/12066* (2013.01); *H04L 61/1511* (2013.01); *H04L 69/22* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto et al. |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott et al. |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger et al. |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 * | 6/2012 | Jacobson ................ H04L 45/00 370/392 |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi et al. |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian et al. |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |

(56) References Cited

U.S. PATENT DOCUMENTS

| | | |
|---|---|---|
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0111467 A1* | 5/2005 | Ng .................. H04L 29/06 370/401 |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog et al. |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0083646 A1* | 4/2007 | Miller ................. H04L 45/7453 709/224 |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0285578 A1* | 11/2008 | DeLay .................. G06F 9/546 370/412 |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |

(56) References Cited

U.S. PATENT DOCUMENTS

| | | |
|---|---|---|
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0020806 A1* | 1/2010 | Vahdat .................. H04L 45/00 370/395.31 |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0095331 A1* | 4/2010 | Hilt .................. H04N 21/2225 725/87 |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0004597 A1* | 1/2011 | Engel .................. H04L 45/00 707/741 |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |

(56) References Cited

U.S. PATENT DOCUMENTS

| | | |
|---|---|---|
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2323346 | 5/2011 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |

(56) References Cited

FOREIGN PATENT DOCUMENTS

| | | |
|---|---|---|
| WO | 2011049890 A1 | 4/2011 |
| WO | 2013123410 | 8/2013 |
| WO | 2015084327 | 6/2015 |

OTHER PUBLICATIONS

Gritter, M. et al., "An Architecture for content routing support in the Internet", Proceedings of 3rd Usenix Symposium on Internet Technologies and Systems, 2001, pp. 37-48.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
J. Lotspiech, S. Nusser, and F. Pestoni. Anonymous Trust: Digital Rights Management using Broadcast Encryption. Proceedings of the IEEE 92.6 (2004).
RTMP (2009). Available online at http://wwwimages.adobe.com/www.adobe.com/content/dam/Adobe/en/devnet/rtmp/ pdf/rtmp specification 1.0.pdf.
S. Kamara and K. Lauter. Cryptographic Cloud Storage. Financial Cryptography and Data Security. Springer Berlin Heidelberg (2010).
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn. The Pairing-Based Cryptography Library, http://crypto.stanford.edu/pbc/.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.

(56) References Cited

OTHER PUBLICATIONS

Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Symposium (2005).
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.

(56) References Cited

OTHER PUBLICATIONS

M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOMM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", a dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.

(56) References Cited

OTHER PUBLICATIONS

Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Lui et al. (A TLV-Structured Data Naming Scheme for Content-Oriented Networking, pp. 5822-5827, International Norkshop on the Network of the Future, Communications (ICC), 2012 IEEE International Conference on Jun. 10-15 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Gamepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], 100131* * figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

* cited by examiner

ADAPTIVE MULTI-INTERFACE USE FOR CONTENT NETWORKING

RELATED APPLICATION

This application is a continuation of U.S. patent application Ser. No. 12/603,336, titled "Adaptive Multi-Interface Use for Content Networking," by inventors Van L. Jacobson and James D. Thornton, filed 21 Oct. 2009.

The subject matter of this application is related to the subject matter in the following applications:

- U.S. patent application Ser. No. 12/123,344, entitled "VOICE OVER CONTENT-CENTRIC NETWORKS," by inventors Paul Stewart, Van Jacobson, Michael Plass, and Diana Smetters, filed 19 May 2008;
- U.S. patent application Ser. No. 12/332,560, entitled "METHOD AND APPARATUS FOR FACILITATING COMMUNICATION IN A CONTENT-CENTRIC NETWORK," by inventor Van Jacobson, filed 11 Dec. 2008; and
- U.S. patent application Ser. No. 12/565,005, entitled "SYSTEM FOR FORWARDING A PACKET WITH A VARIABLE-LENGTH IDENTIFIER," by inventor Van Jacobson, filed 23 Sep. 2009;

the disclosures of which are incorporated by reference in their entirety herein.

BACKGROUND

Field

The present disclosure relates generally to facilitating communication over a data network. More specifically, the present disclosure relates to adaptive use of multi-interface forwarding equipment in content-centric networking.

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of content can only receive the content by explicitly requesting the content from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than the ARPAnet was designed for. Ideally, an Internet user should have access to any content, anywhere, at any time. Such access is difficult to guarantee with the current location/device-binding IP protocol.

Under current web-based naming structures, an idea of the host is implicit in the name which contains the corresponding content. For example, http://www.amazon.com/index.html can be found by contacting the machine www.amazon.com. However, this contact requires a domain name system (DNS) to translate a human-readable host name into an IP address (e.g., 209.34.123.178). In current computer systems, there is no way to refer to a piece of content without knowing what host that file is stored on, and even then the contents associated with that file might change.

In the current technology, forwarding is the process by which a node in a packet-switched network transmits a packet from a source to a destination. An Internet Protocol (IP) router typically receives a packet at one of its input ports (e.g., a network interface). Next, the router performs a lookup to identify an output port to which the packet should be forwarded based on the packet's destination address. However, existing routers do not provide a way to configure the forwarding engine to forward content interests that do not use conventional IP addresses.

SUMMARY

One embodiment provides a system that forwards a packet with a hierarchically structured variable-length identifier (HSVLI) in a network. An HSVLI indicates a piece of content and indicates a hierarchical structure of contiguous components ordered from a most general level to a most specific level. The length of the HSVLI is not fixed. During operation, the system receives a packet which contains an interest for a piece of content with an HSVLI. Subsequently, the system determines forwarding information for the HSVLI based on one or more of: knowledge of content which matches the HSVLI, a forwarding policy, and contextual information about the network. Next, the system configures a forwarding engine with the forwarding information. The system then forwards the packet based on the forwarding information.

In some embodiments, knowledge of content which matches the HSVLI includes one or more of: location of content which matches the HSVLI, availability of content which matches the HSVLI, and importance or priority of content which matches the HSVLI.

In some embodiments, one or more components of the HSVLI include a domain name system (DNS) name, and determining the forwarding information includes determining an output interface based on the DNS name in the HSVLI.

In some embodiments, the policy includes one or more of: a policy rule on content which matches the HSVLI, a security constraint on content which matches the HSVLI, and a strategy rule to discover a source of content which matches the HSVLI.

In some embodiments, contextual information includes information about one or more of: physical layer connectivity, which includes a WiFi connectivity, a local-area network (LAN) connectivity, a wide-area network (WAN) connectivity, and other wired or wireless connectivity; a peer node which is likely to store content which matches the HSVLI; network costs; network latency; and battery status.

In some embodiments, the configuration of the forwarding engine with the forwarding information is in response to one or more of: a status change of the local network, execution of a routing protocol based on information received from another node in the network, and receiving statistical information indicating delay associated with one or more output interfaces.

In some embodiments, the system periodically or continually updates a database used to determine forwarding information by discovering nodes in the network, and establishing a secure tunnel with a discovered node to receive the content.

In some embodiments, the hierarchical structure includes one or more of: a globally routable name, an organizational name, a version identifier, and a digest.

In some embodiments, the system forwards a packet through multiple output interfaces simultaneously.

In some embodiments, the system receives contextual and policy information from a node and virally propagates the contextual and policy information to another node.

BRIEF DESCRIPTION OF THE FIGURES

In the figures, like reference numerals refer to the same figure elements.

Figure 1:
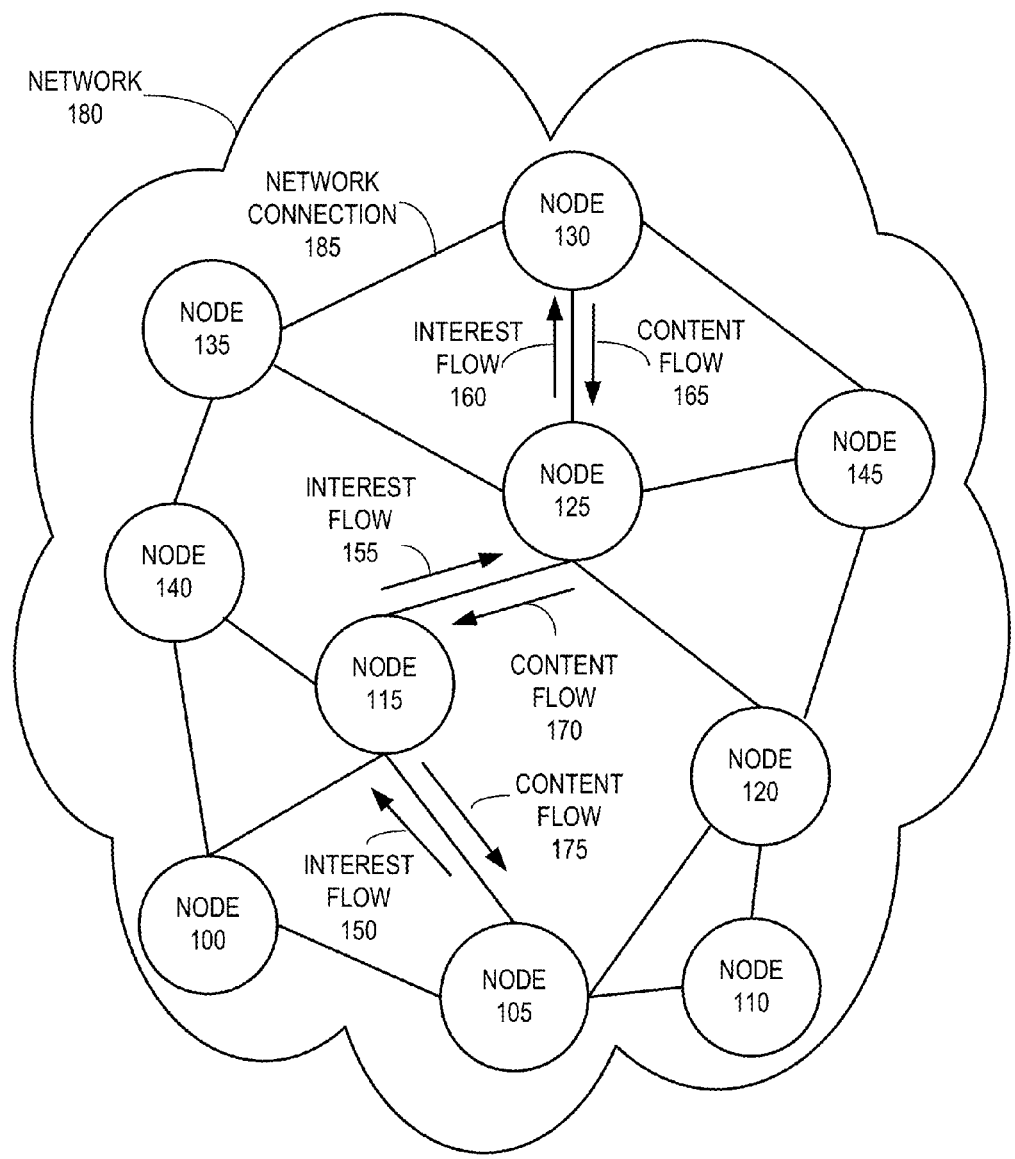
FIG. 1 illustrates an exemplary network where packets have HSVLIs in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

DETAILED DESCRIPTION

Overview

Embodiments of the present invention integrate different information flows to make decisions about how to configure forwarding of interests in particular content collections given multiple simultaneous connectivity options. Specifically, embodiments of the present invention facilitate configuring a forwarding engine that receives interests in content rather than addresses, where the configuration can be based on knowledge of the content, forwarding policies, and contextual information about the network. Embodiments of the present invention also facilitate finer-grained decision-making among multiple forwarding options.

Content centric networks—where routing is based on interests rather than addresses—bring a new approach to content transport. Instead of having network traffic viewed at the application level as end-to-end conversations over which content travels, content is requested or returned based in part on the name given to it, and the network is responsible for routing content from the provider to the consumer. Content includes data that can be transported in the communication system, and can be any form of data such as text, images, video, and/or audio. A consumer and a provider can be a person at a computer or an automated process inside or outside the network. In such a network, a piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In content-centric networks, unlike a conventional IP network, a packet may be identified by an HSVLI. For example, "abcd/bob/papers/ccn/news" could be the name of the content and identifies the corresponding packet(s); i.e., the "news" article from the "ccn" collection of papers for a user named "Bob" at the organization named "ABCD."

To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks which can couple one node to another node. Network 180 can be a local network, a super-network or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interests or originate content.

In accordance with an embodiment of the present invention, a consumer can generate an interest in a piece of content and then send that interest to a node in network 180. The piece of content can be stored at a node in network 180 by a publisher or content provider, who can be located inside or outside the network. For example, in FIG. 1, the interest in a piece of content originates at node 105. If the content is not available at the node, the interest flows to one or more nodes coupled to the first node. For example, in FIG. 1, the interest flows (interest flow 150) to node 115, which does not have the content available. Next, the interest flows (interest flow 155) from node 105 to node 125, which again does not have the content. The interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the interest generation node (node 105) can participate in caching local copies of the content as it travels across the network. Caching reduces the network load for a second subscriber located in proximity to other subscribers by implicitly sharing access to the locally cached content Conventional packet forwarding is based on addresses assigned to nodes (or interfaces of nodes). In IP addressing, a hierarchical division of addresses is used so that the first portion of an address identifies a network, later portions identify a sub-network within that network, and the end of the address identifies a particular host within a sub-network. This arrangement allows the responsibility for assigning unique addresses to be delegated and thereby distributed so that the Internet can scale to worldwide size. It also enables scaling by limiting the amount of information an IP router needs to process when forwarding a packet to an output port.

In one embodiment, a packet is identified by an HSVLI with a hierarchical structure. The hierarchical structure of this HSVLI offers several advantages over the hierarchical structure of an IP address. Such an identifier can describe the structure explicitly through the name rather than implicitly through an IP routing table entry, which includes a subnet mask. Thus, in an HSVLI a naming mistake in the hierarchy can be detected through inspection, whereas an IP-based subnet mask mistake might route a packet to the wrong address and is more difficult to detect.

The forwarding engine can use various methods for matching the interest against an entry associated with forwarding information. For example, embodiments of the present invention can use a longest-prefix match lookup, which can be beneficial to the forwarding of packets with HSVLIs. For example, an interest in "/parc/home/smetters" will match both "/parc/home/smetters/test.txt" and "/parc/home/smetters/bar.txt" (that is, the packets identified by both these names). The longest match, in terms of the number of name components, is considered the best because it is the most specific.

Embodiments of the present invention use HSVLI-based routing process described above, with content retracing the interest path in reverse and caching at nodes. This novel routing mechanism can effectively prevent packet looping. A node can determine when a duplicate packet arrives by an alternate path and refuse to forward it. Thus it is not necessary to have the restriction of forwarding only based on a spanning tree, because multiple and possibly circular paths cannot cause packet looping and hence cost little. A node may identify and use multiple possible paths towards potential sources of content at once, which enables a variety of strategies that are not possible with conventional IP routing, where multicast-like routing or flooding is prohibited. For any particular content collection, there may be not just one but several possible options of interfaces over which to forward interests in the collection and they may have different properties. Embodiments of the present invention provide a means for configuring the forwarding engine to implement the best strategies for different situations.

In some embodiments of the present invention, the system can identify and simultaneously forward a packet along multiple paths toward potential sources of content. This simultaneous forwarding enables the system to accomplish a variety of strategies that are not possible with IP. For example, each path toward the content may have different properties, which the system can subsequently use for configuring the forwarding engine.

Multi-Interface Connectivity Model

Figure 2:
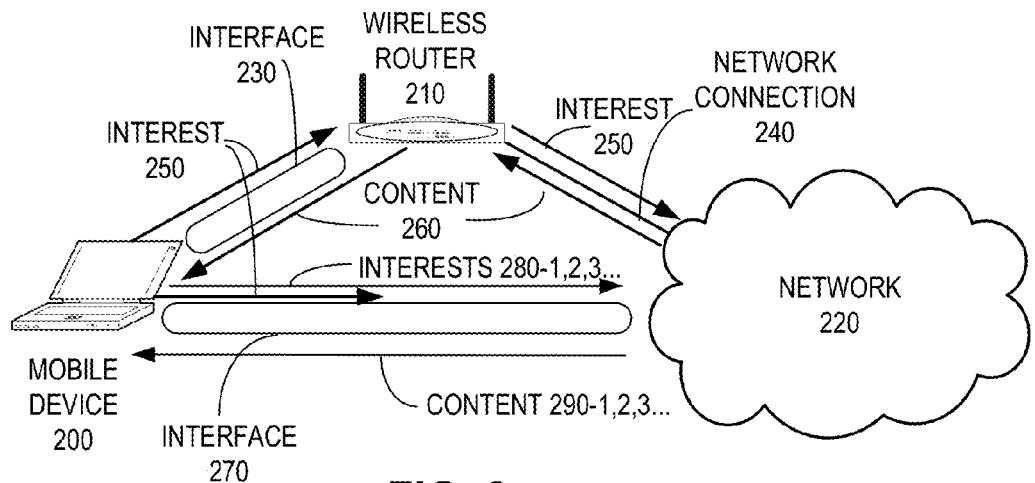
FIG. 2 illustrates an exemplary system for forwarding a packet with an HSVLI via two different routes to the same network in accordance with an embodiment.

FIG. 2 illustrates an exemplary system for forwarding a packet with an HSVLI via two different routes to the same network in accordance with an embodiment. In this example, a mobile device 200 is coupled to a wireless router 210 through an interface 230. Note that an interface can correspond to a port from which interests are sent and content is received. In turn, wireless router 210 is coupled to a network 220, which can be a content centric network, through a network connection 240. Mobile device 200 expresses an interest 250 in a piece of available content. Mobile device 200 can broadcast interest 250 over all available connectivity including but not limited to Wi-Fi, Bluetooth® and wireless carrier connections (i.e., cellular network connections). Any network node receiving the interest and having the content which matches the interest can respond. FIG. 2 shows that network 220 responds with content 260, which is forwarded through wireless router 210, back to mobile device 200.

One example of the criteria used in choosing an interface is the responsiveness to previous similar interests over that same interface. For example, in FIG. 2, interest 250 may initially be broadcast simultaneously on both interfaces 230 and 270. The system may then discover that content matching the interest is received faster through interface 270. The system will further forward subsequent interests 280-1, 2, 3, . . . only through interface 270 but not on interface 230. This example illustrates that the system can change its forwarding information based on the time it takes to receive matching content.

The system can also change its forwarding for an interest based on the cost of forwarding. An example of a policy leading to such a forwarding decision is a user preferring to access a large file over an available Wi-Fi hot spot connection instead of a more expensive carrier network.

FIG. 2 also illustrates a sequence of interests 280-1, 2, 3, . . . . Although the system broadcasts interest 250 through interfaces 230 and 270, the system decides to forward subsequent interests 280-1, 2, 3, . . . through interface 270. In addition, the system may also decide to forward these interests to interface 230 because of a better network condition such as lower latency. The system may determine this lower latency based on the content returned in response to interest 250 which is previously broadcast on interfaces 230 and 270. The system can also forward individual interests alternately on one interface or the other, or send them simultaneously over multiple interfaces using various multicast suppression techniques. For example, the system can continuously probe for better connectivity and forward interests according to the result of that probe. Note that in response to interests 280-1, 2, 3, . . . , the network returns content 290-1, 2, 3, . . . via interface 270 back to mobile device 200.

Figure 3:
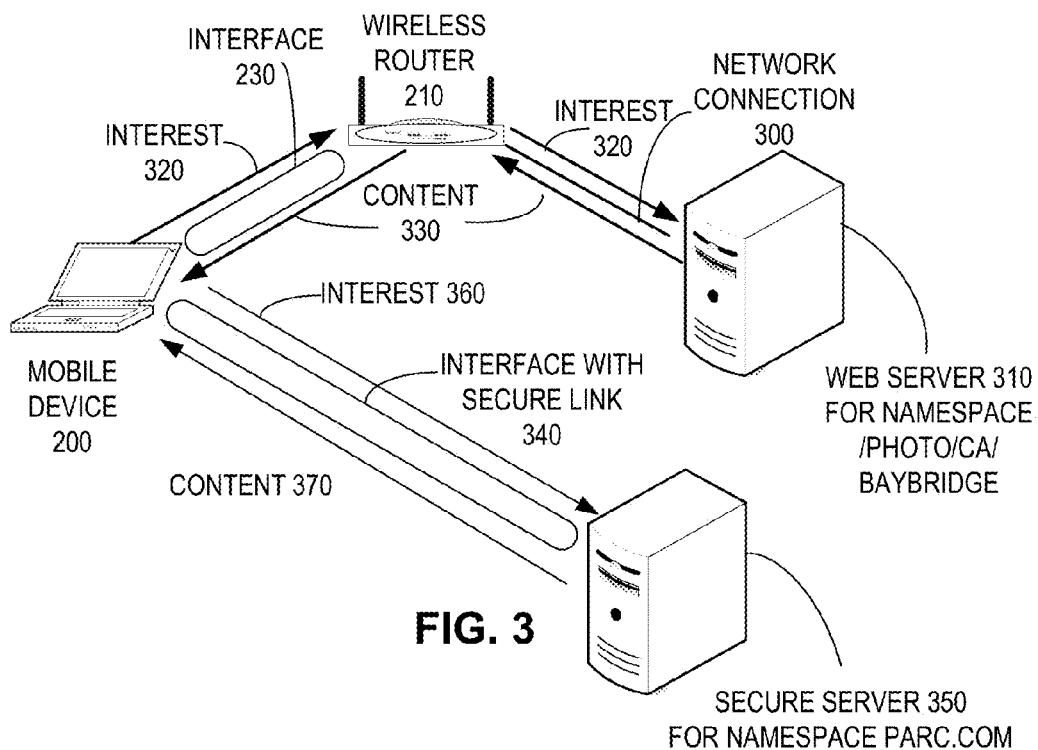
FIG. 3 illustrates an exemplary system for forwarding packets corresponding to two different interests in content in accordance with an embodiment.

FIG. 3 illustrates an exemplary system for forwarding packets corresponding to two different interests in content in accordance with an embodiment. In this example, mobile device 200 expresses an interest in content from two different namespaces ("parc.com" and "/photo/ca/baybridge") and pulls content from those two different namespaces over interface 230 and an interface with secure link 340 simultaneously. Such an example might arise if a user needs a secure tunnel to access "/parc.com/jim" while pulling pictures of the San Francisco Bay Bridge over a public Wi-Fi connection. A web server 310 for namespace "/photo/ca/baybridge" returns content matching an interest in pictures of the San Francisco Bay Bridge. A secure server 350 for namespace parc.com returns content matching an interest in "/parc.com/jim."

Embodiments of the present invention can configure the forwarding engine to forward interest packets over single or multiple interfaces, permitting fine-grained dynamic choices among multiple interfaces at a low level.

Architecture for Forwarding Interest Packets

Figure 4:
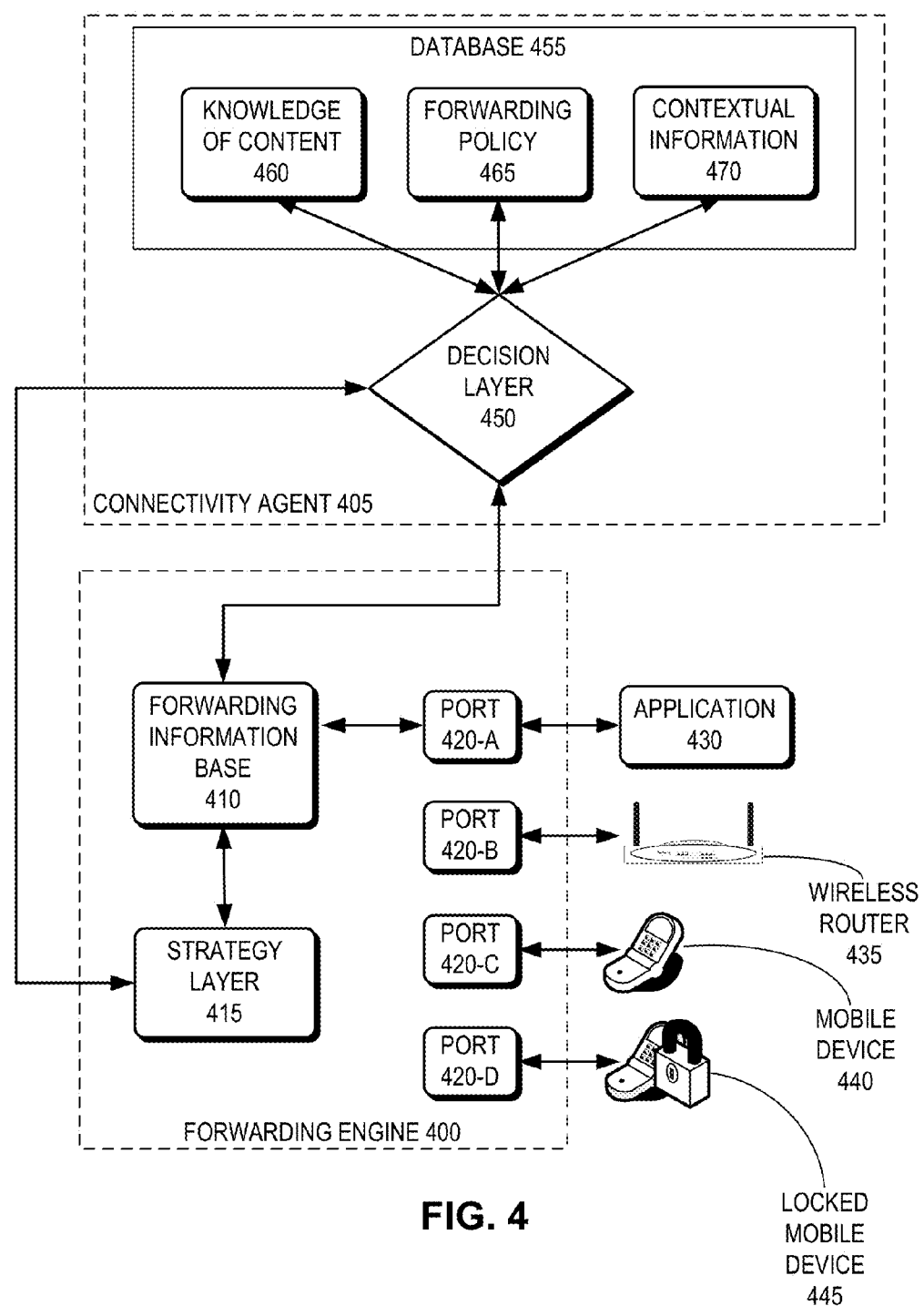
FIG. 4 presents an exemplary high-level architecture for forwarding a packet with an HSVLI in accordance with an embodiment.

FIG. 4 presents a high-level architecture illustrating the process of forwarding interest packets with an HSVLI in accordance with an embodiment. In this example, a packet forwarding system includes a forwarding engine 400 and a connectivity agent 405. Forwarding engine 400 includes a forwarding information base (FIB) 410, a strategy layer 415, and ports 420-A to 420-D, which are coupled respectively to an application 430, a wireless router 435, a mobile device 440, and a locked mobile device 445. In FIG. 4, bi-directional arrows between components denote two-way communication, programmable capabilities between a source and a destination arrow, or statistical feedback. Note that a port has an input side (i.e., an input port) and an output side (e.g., an output port).

FIB 410 is a database that can facilitate a lookup by a longest-match name prefix to determine which interface(s) an interest can be forwarded to. A strategy layer 415, which can be hardware or software, makes the fine-grained, packet-by-packet decision among multiple interfaces when the lookup produces multiple interfaces. Note that ports can communicate with individual applications, local networks, or with channels or tunnels, such as secure encrypted links.

Consider an interest arriving at port 420-A in forwarding engine 400. Typically, forwarding engine 400 includes a content store (CS, not shown) which is a local cache of previously received content. Assuming that the new interest arriving on port 420-A does not match any content in the CS, the interest is sent to FIB 410 for lookup. The system can use various lookup methods such as a longest-prefix match or an exact match. If the system does not find a match in FIB 410, the interest is sent to connectivity agent 405. Connectivity agent 405 can configure FIB 410 with forwarding information about a new content collection, assuming that the connectivity agent is able to identify a direction (e.g. interface/tunnel) toward that content collection.

In one embodiment, connectivity agent 405 determines one or more entries to be inserted into FIB 410, which indicate how to forward the interest based on the interest, content, and/or forwarding policy. The system can then re-inject the interest to forwarding engine 400, which can ensure a match for the interest.

If connectivity agent 405 cannot determine a way to forward the interest and reach the content collection, the interest can be discarded. Note that if the system is unable to match an interest in FIB 410, the system does not immediately discard the interest. Instead, the system transfers the interest to connectivity agent 405, which permits dynamic actions to identify a path that is not previously configured in FIB 410. For example, connectivity agent 405 can perform a domain name system (DNS) lookup on a prefix of the HSVLI associated with the interest for dynamic overlay routing in the public Internet. Forwarding engine 400 can still be configured to discard unmatched interests, for example, when the connectivity agent is not running.

If the system identifies a match for the interest in FIB 410, the interest and the corresponding one or more output port(s) can be sent to strategy layer 415. Strategy layer 415 uses the results of a successful lookup in FIB 410 to determine which output ports to use for the interest. Note that the system can still send the interest to the connectivity agent 405 despite a match being found in FIB 410. This operation facilitates opportunistic local broadcast to find content as well as dynamic configuration of specific paths to the content collection.

Connectivity agent 405 can control the implemented policy by configuring strategy layer 415 without having to process each individual packet. In one embodiment, connectivity agent 405 can configure strategy layer 415 with rules for choosing among multiple interfaces. For example, such rules can specify priority-based interface selection, a round-robin-sequence-based interface selection, or interface priorities based on fine-grained response timing. In another embodiment, configuration agent 405 can install an executable program in strategy layer 415 so that strategy layer 415 can execute the program to handle packets. Executable programs enable strategy layer 415 to have fine-grained control over where to forward packets.

Various methods can be used to configure forwarding engine 400 to transfer an interest to connectivity agent 405. For example, using longest-prefix matching, a zero-length prefix entry in FIB 410 will match any interest that does not match a longer "regular" entry. An interest that matches the zero-length prefix will cause the interest to be forwarded to the connectivity agent using normal processing (i.e., forwarding through an output port). Similarly, an interface associated with connectivity agent 405 can be added to the list for any entry in FIB 410. Adding this entry can allow configuration for specific paths as well as opportunistic broadcasts. In short, transfer of an interest from forwarding engine 400 to connectivity agent 405 can be through special-case handling in FIB 410 (as when there is no match at all) or through normal entries in FIB 410.

Connectivity Agent

Continuing with FIG. 4, connectivity agent 405 includes a decision layer 450, which sets forwarding rules based on database 455. Database 455 includes knowledge of content 460 which matches the interest (i.e., the HSVLI), forwarding policy 465, and contextual information 470 about the network. Embodiments of the present invention can use connectivity agent 405 to integrate information in database 455 and configure forwarding information base 410 to find content in a dynamic network environment.

Knowledge of content 460 which matches the interest includes information about the content, such the location(s) of the content as may be learned through a routing protocol, availability of content, and immediate importance or priority of content to an end user. There are many different ways to do routing to propagate and discover information about locations and availability of content.

Forwarding policy 465 can include policy rules, security constraints on specific collections of content (such as personal information), and generic strategy rules (e.g., try all output ports to discover the fastest source of content in a collection). The system can identifying particular collections based on the prefix of the HSVLI and can associate a policy rule, a constraint, and a strategy with that prefix.

Contextual information 470 about the network can include information about available physical layer connections (Wi-Fi, LAN, carrier network, etc.), knowledge of peers, network costs, network latency, and battery status. For interests sent from forwarding engine 400 to decision layer 450, decision layer 450 can interact with database 455 to determine how to configure FIB 410 to control the forwarding of the outgoing interest toward content that can match the interest.

Decision layer 450 can aggregate information from knowledge of content 460, forwarding policy 465, and contextual information 470. Based on the information available in database 455, connectivity agent 405 can set up the configuration for a new port, for example by creating a tunnel connection over the public Internet.

As an example, consider the arrival of an interest in "www.google.com/michaeljackson/photo/" on port 420-A.

The system can perform the following operation to create a new port. The system first receives the interest, which cannot be satisfied by any content in the CS. The system then looks up the interest in FIB 410. If the system does not find a match in FIB 410, the system sends the interest to connectivity agent 405. Within connectivity agent 405, decision layer 450 aggregates information about the content, policy, and available networks from database 455. Specifically, connectivity agent 405 uses knowledge of content 460 (e.g., when the prefix of the identifier associated with the interest's HSVLI is a DNS name), forwarding policy 465 (e.g., try local, use shortest delay or least round trip time, or no constraints on the given collection), and contextual information 470 (e.g., Wi-Fi and adjacent network nodes) from database 455 to determine how to forward the interest.

If the interest's HSVLI contains a domain name, connectivity agent 405 then performs a DNS lookup to discover an IP address to which a tunnel may be created for a network overlay transport. Decision layer 450 then configures forwarding engine 400 to create the new tunnel connection via a respective output port. Decision layer 450 further configures the forwarding information base 410 so that an interest in "www.google.com" will be broadcast first over all available local network ports (to find local copies, if available) and then forwarded (if not already satisfied) on the port corresponding to the overlay tunnel. Subsequently, connectivity agent 405 can re-inject the interest to forwarding engine 400 so that it may be forwarded according to the newly established configuration.

As a second example, consider an interest in obtaining personal financial reports from "www.bankofamerica.com/account/report." Below are the matching criteria within each group that decision layer 450 can use to determine forwarding information. Knowledge of content 480 can use the prefix associated with the interest is a DNS name with content reachable via tunnel. Forwarding policy 465 can determine whether an outside home Wi-Fi network should use a secure encrypted tunnel for a prefix matching "www-.bankofamerica.com/account/report." Contextual information 470 can determine an available airport Wi-Fi and/or a carrier network. Connectivity agent 405 can now configure forwarding engine 400 to use a secure tunnel over port 420-c and adding a FIB entry so that these interests are forwarded port 420-c to ensure that no information about the requests is revealed.

Overall System Operation

Figure 5:
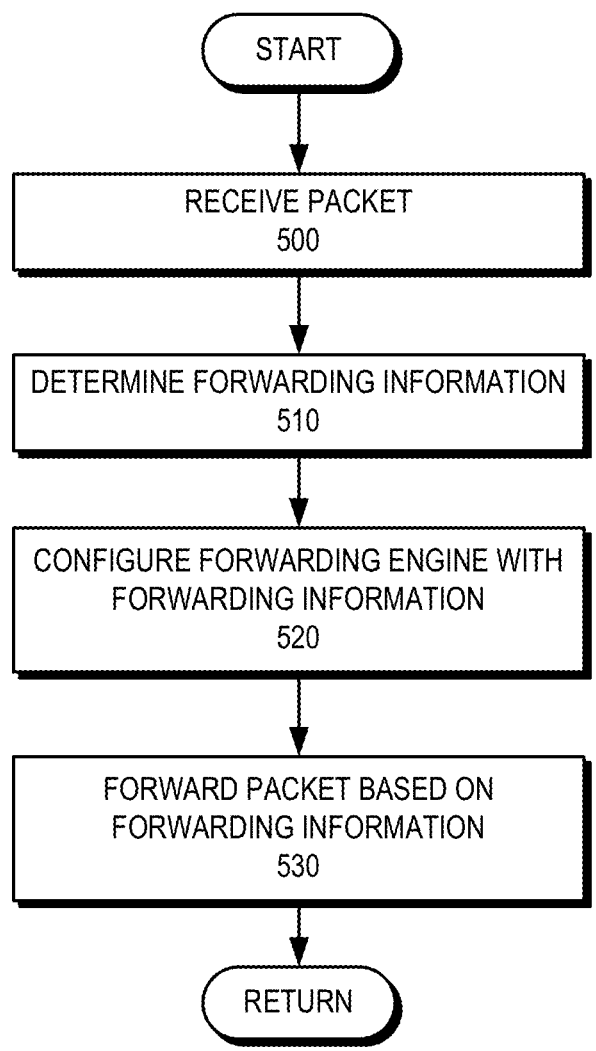
FIG. 5 presents a flow chart illustrating the process of forwarding a packet with an HSVLI in accordance with an embodiment.

FIG. 5 presents a flow chart illustrating the process of forwarding a packet with an HSVLI in accordance with an embodiment. During operation, the system receives a packet which contains an interest for a piece of content with an HSVLI (operation 500). For example, the system can receive the packet at connectivity agent 405 from the forwarding engine 400 or from any port associated with the system. Subsequently, the system determines forwarding information for the HSVLI based on one or more of: knowledge of content 460 which matches the HSVLI, forwarding policy 465, and contextual information 470 about the network (operation 510). Next, the system configures a forwarding engine with the forwarding information (operation 520).

Configuring the forwarding information can involve configuring the entries of FIB 410. For example, FIB 410 can contain prefixes as entries and one or more output ports associated with each entry. The system can also modify an existing entry so that it matches the interest and so that the output port(s) correspond to the forwarding information configured by connectivity agent 405. Subsequently, the system forwards the packet based on the forwarding information (operation 530). Forwarding the packet can involve sending the packet through the output port(s) and as selected by strategy layer 415.

Dynamic Configuration

In some embodiments, the system does not necessarily trigger connectivity agent 405 when it fails to match a received interest in FIB 410. That is, connectivity agent 405 can configure forwarding engine 400 at any time in response to changes in knowledge of content 460, forwarding policy 465, and contextual information 470, which connectivity agent 405 can continuously monitor. For example, the local networks accessible (part of contextual information 470) to a node can change dynamically as the node moves around. Execution of a routing protocol with other connectivity agents can result in changes to the knowledge of where content under various prefixes can be found. These changes can result in changes to the configuration of FIB 410.

Another source of updates to database 455 is forwarding engine 400, which can provide statistical information to connectivity agent 405. For example, statistical information about consistent round trip delays of retrieving content on different interfaces (ports) might be used by connectivity agent 405 to change priorities of multiple interfaces in FIB 410. One direction of the bi-directional arrow between strategy layer 415 and decision layer 450 denotes the flow of statistical information from strategy layer 415 to decision layer 450.

Active Discovery

Connectivity agent 405 can also perform active operations to update database 455. For example, connectivity agent 405 can periodically or continually run a discovery protocol on local networks to identify nodes with which it can establish secure tunnels for the exchange of information. Furthermore, connectivity agent 405 can discover that a certain mobile node in the network is no longer accessible because the node was moved by its owner.

Figure 6:
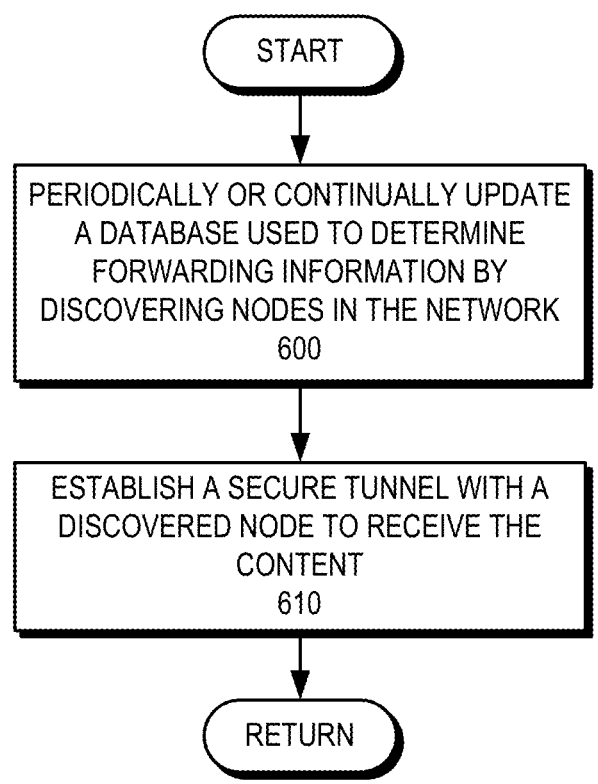
FIG. 6 presents a flow chart illustrating the process of running a discovery protocol to identify a node that provides content and establishes a tunnel thereto, in accordance with an embodiment

FIG. 6 presents a flow chart illustrating the process of running a discovery protocol to identify a node that provides content and establishes a tunnel thereto, in accordance with an embodiment. During operation, the system can periodically or continually update a database (e.g., database 455) to determine forwarding information by discovering nodes in the network (operation 600). Next, the system can establish a secure tunnel with a discovered node to receive the content matching an interest (operation 610).

Controlled Information

The system can configure FIB 410 based on a flow of statistical information and performance information between the strategy layer 415 and decision layer 450. Strategy layer 415 can provide performance-based tuning to exploit multiple connections under changing conditions. Strategy layer 415 can also be used to make last-minute or fine time scale adjustments for port use. As a control mechanism for this closed loop of information flow between strategy layer 415 and decision layer 450, a threshold mechanism can be used to set the conditions for what is working and what is not working based on statistical information and performance feedback data.

The following examples illustrate how decision layer 450 uses information from strategy layer 415 to re-inject interests and reconfigure ports. Decision layer 450 can set a rule to broadcast a particular interest over all available ports. For a subsequent interest, decision layer 450 notifies the forwarding engine 400 to route all outgoing interests to the port leading to a public Wi-Fi. But based on real-time information from strategy layer 415 to decision layer 450 that the Wi-Fi interface is performing poorly, decision layer 450 reconfigures FIB 410 to prioritize an alternative port for a local network that is performing better.

As another example, decision layer 450 can set up new forwarding rules based on historical performance data such as round-trip time (RTT) and layer-2 performance data, stored and collected by strategy layer 415 and forwarded to decision layer 450.

Inter-Node Learning

The system can also learn policies from other devices on the network. Once a device is associated as belonging to a particular family of devices, for example, the system can retrieve and validate configuration information from that device. An example of this is a flow of policy information from that device directly to forwarding policy 465.

The system can facilitate viral propagation of knowledge about devices and policies. For example, the system (which can be located at a node in the network) can request or share information with another authorized node about where a source for a content collection, such as particular pictures, is located in network terms. Such information can include such items as the identifier of the local network(s) to which a source is directly connected and the IP address(es) that a source can use. This contextual knowledge about devices may be used to select and configure connections to them such as overlay tunnels. The node at which the system is located can then propagate this information to another node. In an environment with continuously moving mobile devices (e.g. an airport), dozens of nodes can "infect" each other with such information in a few minutes. For example, node 1 can "infect" node 2, which can "infect" node 3, which can "infect" node 4 and so on.

This viral propagation of knowledge about devices and policies can be enabled by the system's ability to retrieve content by name without knowledge of other nodes and by the system's security model, which can allow secure verification of information to be bootstrapped from a minimal configuration. As another example, a new device can dynamically learn a database from an old replacement device without the need for complete reconfiguration.

Multi-Port Forwarding

The system can forward an interest over multiple ports. That is, the system can attempt to retrieve content via multiple network paths in parallel and without the restriction of forwarding on a spanning tree, which would restrict the forwarding at any one node to a single link. For example, a sequence of interests in the same content collection (e.g., same prefix namespace) can be split over multiple ports. Furthermore, a user might want to download a video before boarding a flight and the interests associated with the video can be distributed over multiple ports simultaneously to improve download time. For example, different segments of the video can be requested by simultaneous interests. As a contrasting example, forwarding policy 465 might specify the use of all available ports for all interests to ensure higher reliability. Decision layer 450 can be responsible for setting up a one-plus-one redundancy.

Apparatus for Adaptive Multi-Use Interface for Content Networking

Figure 7:
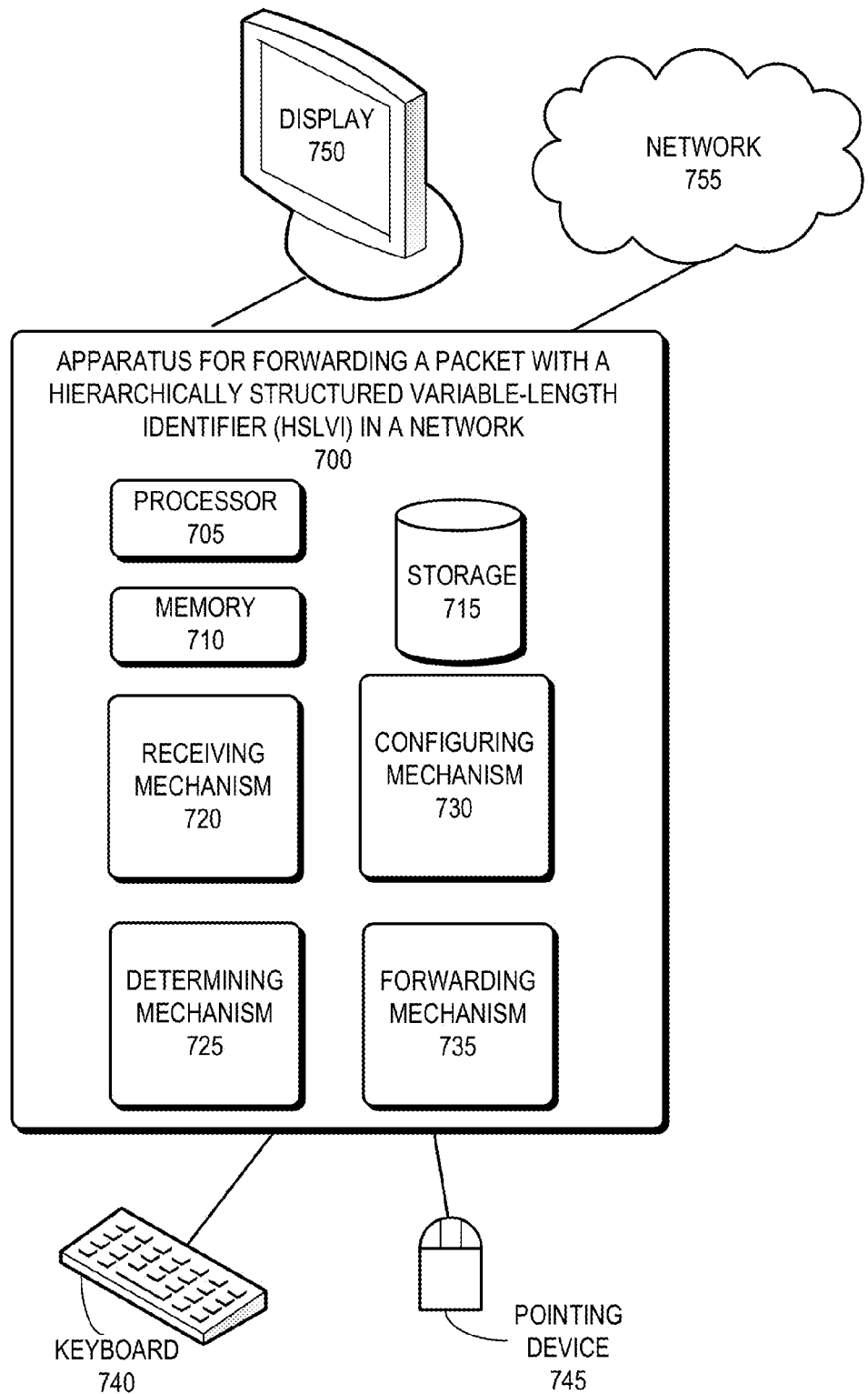
FIG. 7 presents an apparatus for forwarding a packet with an HSVLI in accordance with an embodiment.

FIG. 7 presents an apparatus for forwarding a packet with an HSVLI in accordance with an embodiment.

In accordance with embodiment, apparatus 700 for forwarding a packet with an HSVLI in a network, includes a processor 705, a memory 710, a storage 715, a receiving mechanism 720, a determining mechanism 725, a configuring mechanism 730, and a forwarding mechanism 735, all of which can be in communication with each other through various means.

In some embodiments, mechanisms 720-735 can be part of processor 705. Further, in some embodiments, the system may not include a separate processor and memory. Instead, in addition to performing their specific tasks, mechanisms 720-735, either separately or in concert, may be part of a general-purpose computation engine.

Storage 715 stores programs to be executed by processor 705. Specifically, storage 715 stores a program that implements a system (application) for forwarding a packet with an HSVLI. During operation, the application program can be loaded from storage 715 into memory 710 and executed by processor 705. As a result, apparatus 700 for forwarding a packet with an HSVLI can perform the functions described above. Apparatus 700 for forwarding a packet with an HSVLI can be coupled to an optional display 750, keyboard 740, and pointing device 745. Apparatus 700 is also coupled to network 755, which can be content-centric.

In an embodiment, processor 705 activates receiving mechanism 720 and supplies it with the packet. Next, processor 705 activates determining mechanism 725 and supplies it with the HSVLI indicated by the packet, and optionally with the packet. Subsequently, processor 705 activates configuring mechanism 730 and supplies it with forwarding information obtained from determining mechanism 725. Next, processor 705 activates forwarding mechanism 735 and supplies it with the forwarding information obtained from determining mechanism 725 by re-injecting the interest associated with the packet into the forwarding engine 400 and obtaining the forwarding information from forwarding information base 410.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for forwarding a packet with a hierarchically structured variable-length identifier (HSVLI) in a network, comprising:
   performing a lookup for a packet based on an HSVLI in a local forwarding information base (FIB) to determine forwarding information for the packet, wherein the packet comprises an interest for a piece of content expressed using the HSVLI;
   wherein the HSVLI indicates the content and is hierarchically structured, and comprises contiguous components ordered from a most general level to a most specific level, and wherein the length of a respective HSVLI is not fixed;
   in response to not finding a match for the HSVLI in the local FIB:
      determining, by a connectivity agent, a forwarding decision and the forwarding information for the HSVLI; and
      configuring an entry in the FIB to contain the HSVLI associated with the determined forwarding decision and forwarding information;
   forwarding the packet based on the forwarding information; and
   in response to receiving a second packet containing at least a prefix of the HSVLI and to identifying, via a second lookup in the local FIB that the HSVLI is a longest match for the prefix having a largest number of matched name components, forwarding the second packet based on the forwarding information.

2. The method of claim 1, wherein the forwarding decision includes selecting one or more local interfaces for forwarding the packet.

3. The method of claim 1, wherein the forwarding decision and the forwarding information are determined based on one or more of: knowledge of content which matches the HSVLI, a forwarding policy, and contextual information.

4. The method of claim 1, further comprising:
   determining a local interface to be a lower-latency interface among a plurality of local interfaces; and
   selecting the local interface for forwarding packets comprising subsequent interests expressed using respective HSVLIs.

5. The method of claim 1, wherein one or more components of the HSVLI comprise a domain name system (DNS) name; and
   wherein the method further comprises:
      identifying an Internet Protocol (IP) address mapped to the DNS name; and
      establishing a tunnel to the identified IP address.

6. The method of claim 1, wherein the interest is further for a second piece of content, wherein the piece of content and the second piece of content are from two different namespaces.

7. The method of claim 6, further comprising pulling the piece of content and the second piece of content from the two different namespaces via two different local interfaces.

8. The method of claim 1, further comprising:
   monitoring for changes in one or more of: knowledge of content which matches the HSVLI, a forwarding policy, and contextual information; and
   in response to observing a change in the knowledge of content, forwarding policy, or contextual information, and further in response to finding a match for the HSVLI in the local FIB during the lookup, re-determining the forwarding decision for the HSVLI based on the observed change.

9. The method of claim 8, further comprising selecting an interface from a set of matched interfaces for forwarding the packet based on one or more rules for choosing among multiple interfaces.

10. An apparatus for forwarding a packet with a hierarchically structured variable-length identifier (HSVLI) in a network comprising:
    a processor;
    a memory;
    a determining mechanism configured to perform a lookup for a packet based on an HSVLI in a local forwarding information base (FIB) to determine forwarding information for the packet, wherein the packet comprises an interest for a piece of content expressed using the HSVLI;
    wherein the HSVLI indicates the content and is hierarchically structured, and comprises contiguous components ordered from a most general level to a most specific level, and wherein the length of a respective HSVLI is not fixed;
    a configuring mechanism, in response to the determining mechanism not finding a match for the HSVLI in the local FIB, configured to:
       determine a forwarding decision and the forwarding information for the HSVLI; and
       configure an entry in the local FIB to contain the HSVLI associated with the determined forwarding decision and forwarding information; and
    a forwarding mechanism configured to forward the packet based on the forwarding information;
    wherein the forwarding mechanism is further configured, in response to receiving a second packet containing at least a prefix of the HSVLI and to identifying, via a second lookup in the local FIB that the HSVLI is a longest match for the prefix having a largest number of matched name components, to forward the second packet based on the forwarding information.

11. The apparatus of claim 10, wherein the forwarding decision includes selecting one or more local interfaces for forwarding the packet.

12. The apparatus of claim 10, wherein the configuring mechanism determines the forwarding decision and the forwarding information based on one or more of: knowledge of content which matches the HSVLI, a forwarding policy, and contextual information.

13. The apparatus of claim 10, wherein the determining mechanism is further configured to:
    determine a local interface to be a lower-latency interface among a plurality of local interfaces; and
    select the local interface for forwarding packets comprising subsequent interests expressed using respective HSVLIs.

14. The apparatus of claim 10, further configured to establish a tunnel to an Internet Protocol (IP) address, wherein one or more components of the HSVLI comprise a domain name system (DNS) name, and wherein the IP address is mapped to the DNS name.

15. The apparatus of claim 10, wherein the interest is further for a second piece of content, wherein the piece of content and the second piece of content are from two different namespaces.

16. The apparatus of claim 15, further configured to pull the piece of content and the second piece of content from the two different namespaces via two different local interfaces.

17. The apparatus of claim 10, further configured to:
monitor for changes in one or more of: knowledge of content which matches the HSVLI, a forwarding policy, and contextual information; and
re-determine the forwarding decision for the HSVLI in response to observing a change in the knowledge of content, forwarding policy, or contextual information, and further in response to the determining mechanism finding a match for the HSVLI in the local FIB during the lookup, wherein the re-determination is based on the observed change.

18. The apparatus of claim 17 further configured to select an interface from a set of matched interfaces for forwarding the packet based on one or more rules for choosing among multiple interfaces.

19. A non-transitory computer-readable storage device storing instructions that when executed by a computer cause the computer to perform a method for forwarding a packet with a hierarchically structured variable-length identifier (HSVLI) in a network, the method comprising:
performing a lookup for a packet based on an HSVLI in a local forwarding information base (FIB) to determine forwarding information for the packet, wherein the packet comprises an interest for a piece of content expressed using the HSVLI;
wherein the HSVLI indicates the content and is hierarchically structured, and comprises contiguous components ordered from a most general level to a most specific level, and wherein the length of a respective HSVLI is not fixed;
in response to not finding a match for the HSVLI in the local FIB:
  determining a forwarding decision and the forwarding information for the HSVLI; and
  configuring an entry in the FIB to contain the HSVLI associated with the determined forwarding decision and forwarding information;
forwarding the packet based on the forwarding information; and
in response to receiving a second packet containing at least a prefix of the HSVLI and to identifying, via a second lookup in the local FIB that the HSVLI is a longest match for the prefix having a largest number of matched name components, forwarding the second packet based on the forwarding information.

* * * * *